United States Patent [19]

Matsumoto

[11] 4,409,631

[45] Oct. 11, 1983

[54] OPTICAL APPARATUS AND METHOD FOR REPRODUCING INFORMATION RECORDED IN A MAGNETIC RECORDING MEDIUM

[75] Inventor: Kazuya Matsumoto, Yokohama, Japan

[73] Assignee: Canon Kabushiki Kaisha, Tokyo, Japan

[21] Appl. No.: 306,536

[22] Filed: Sep. 28, 1981

[30] Foreign Application Priority Data

Dec. 27, 1980 [JP] Japan ............................. 55-188878

[51] Int. Cl.³ ........................................... G11B 5/32
[52] U.S. Cl. ................................. 360/114; 369/110
[58] Field of Search ...................... 360/114; 369/110

[56] References Cited

U.S. PATENT DOCUMENTS

| 3,983,317 | 9/1976 | Glorioso | 369/110 |
| 4,337,535 | 6/1982 | Van Megen et al. | 369/110 |

FOREIGN PATENT DOCUMENTS

| 56-16950 | 2/1981 | Japan | 369/110 |
| 2044980 | 10/1980 | United Kingdom | 369/110 |
| 2058434 | 4/1981 | United Kingdom | 369/110 |
| 80/01016 | 5/1980 | World Intel. Prop. Org. | 369/110 |

*Primary Examiner*—George G. Stellar
*Attorney, Agent, or Firm*—Fitzpatrick, Cella, Harper & Scinto

[57] ABSTRACT

An optical apparatus to reproduce information recorded by a magnetic recording medium in utilization of the interaction between light and magnetism, the apparatus being constructed with a light source to supply a light beam for reproduction; a polarizing beam splitter, the transmission and reflection factors of which are dependent on the polarizing direction of the light beam, and which leads the light beam for reproduction from the light source to the magnetic recording medium, and, in interaction with the magnetism in the magnetic recording medium, receives again the emitting light beam for reproduction to lead it to a direction different from the direction of the light source; and a rotatory polarizing device disposed in a light path of the light beam for reproduction between the polarizing beam splitter and the magnetic recording medium, and to rotate the polarized plane of the light beam for reproduction.

5 Claims, 8 Drawing Figures

OPTICAL APPARATUS AND METHOD FOR REPRODUCING INFORMATION RECORDED IN A MAGNETIC RECORDING MEDIUM

BACKGROUND OF THE INVENTION

This invention relates to an optical apparatus and a method for reading information recorded in a magnetic recording medium utilizing interaction between light and magnetism.

In recent years, use of a vertical magnetic recording medium having a readily magnetizable axis in the direction perpendicular to the surface of a coating film has drawn attention of all concerned as a recording and reproducing system capable of optically reading information contained in the recording medium with super-high density.

This system is to read out recorded information by first illuminating with rectilinearly polarized light a vertical magnetization recording film where a magnetic domain having an upward magnetization with respect to the film surface and another magnetic domain having a downward magnetization thereto have been formed in correspondence to information to be recorded, and then detecting patterns of the abovementioned magnetic domains by use of a phenomenon where the polarized plane rotates depending on the direction of the magnetization, e.g., the magnetic Kerr effect or the Faraday effect.

DESCRIPTION OF PRIOR ARTS

The vertically magnetized optical reading system has been disclosed in the Japanese laid-open patent application No. 54-59915, a schematic layout of which is shown in FIG. 1 of the accompanying drawing. In the illustration, a reference numeral 1 designates a polarizing plate, a numeral 2 refers to a beam splitter (which usually uses a half-mirror), a numeral 3 refers to a vertical magnetic recording member, 4 refers to an object lens of a microscope, 5 designates an analyzer, and 6 refers to an eyepiece lens.

In this optical system, a light beam which has been linearly polarized by the polarizing plate 1 is projected onto the vertical magnetization recording member 3. The incident light beam is subjected to rotation, in its polarizing direction, in the mutually opposite direction by the magnetic Kerr effect (or the Faraday effect) in correspondence to the magnetizing direction (upward or downward direction) of the vertical magnetic recording member 3, and is then reflected. Assume, for example, a light beam to be reflected from the downward portion in the magnetizing direction is subjected to rotation represented by $\theta_k$. A light beam to be reflected from the upward portion in the magnetizing direction is subjected to roation represented by $-\theta_k$.

When the polarizing direction of the analyzer 5 is taken in the direction perpendicular to the abovementioned polarizing direction $\theta_k$, the reflected light beam from the downwardly magnetized section is intercepted by the analyzer 5, and only a $\sin(2\theta_k)$ component of the reflected light beam from the upwardly magnetized section passes through the analyzer 5, whereby a vertically magnetized pattern can be observed.

Since this conventional method, however, causes the rectilinear polarized light beam to pass twice through the beam splitter 2, it possesses the disadvantage that the quantity of light is reduced to a quarter to make it impossible to observe the pattern in the magnetic domains at a high contrast.

In order to avoid this disadvantage, it can be contemplated to use a polarizing beam splitter positioned in such a deflected direction so as to reflect most of the incident rectilinear polarized light beam. With such a beam splitter, however, observation of the magnetic domain is virtually impossible from the theoretical point of view. The reason for this is that the reflected light beams from the upwardly magnetized domain and the downwardly magnetized domain pass through the polarized beam splitter in the same quantity as that of the light components when they pass through it again , because the polarizing plane rotates symmetrically with respect to the deflected direction of the polarizing beam splitter with the result that no contrast occurs between these magnetic domains.

SUMMARY OF THE INVENTION

In view of the foregoing, it is the primary object of the present invention to provide an optical apparatus and a method capable of reproducing information recorded in the magnetic medium in good state of the reproduced pattern, with reduced loss in the light beams to be used in the course of reproduction operation in utilization of the interaction between light and magnetism.

It is the secondary object of the present invention to provide an optical apparatus and a method capable of optically reproducing information recorded in a magnetic medium and with the reproduced pattern of a high contrast.

The foregoing objects of the present invention can be achieved, in one typical example of the optical apparatus and method, by combining a polarizing beam splitter and a rotatory polarizing means such as, for example, a Faraday rotatory element to cause the polarization plane of a light beam to rotate.

It is to be noted that, throughout the specification, by the term "polarizing beam splitter" is meant such a beam splitter in which the transmission and reflection factors vary depending on the polarizing direction of the incident light beam thereinto.

It is to be further noted that, in the optical apparatus and method of the present invention, the polarizer 1 and the analyzer 5 in the conventional apparatus shown in FIG. 1 may be dispensed with, and that the apparatus of the present invention may share most of its parts in common with the recording device.

DETAILED DESCRIPTION OF PREFERRED EMBODIMENTS

Figure 2:
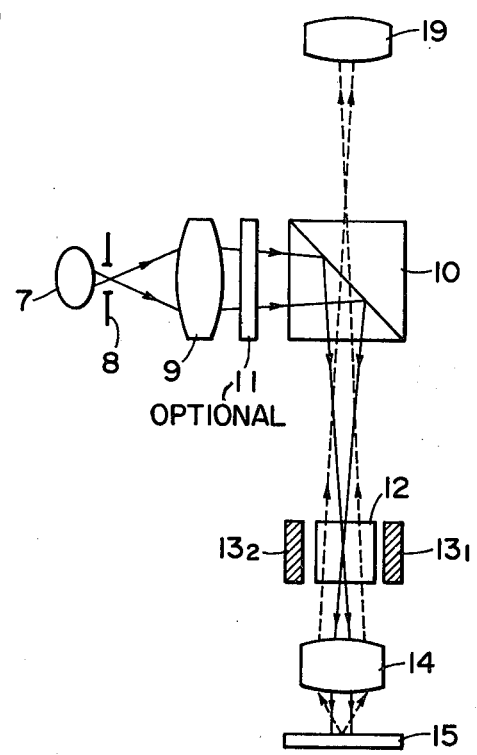
FIG. 2 is a schematic layout of one embodiment of the optical system according to the present invention.
Figure 3:
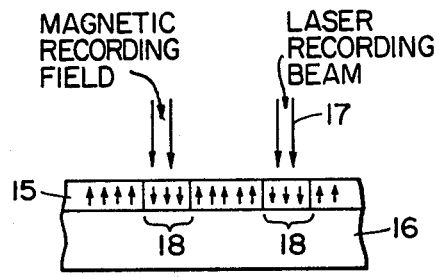
FIG. 3 is a fragmentary cross-sectional view showing magnetic domain patterns in the vertically magnetized film.

FIG. 2 is a cross-sectional view of the first embodiment of the optical system according to the present invention as applied to observation of the magnetic domain in the vertically magnetized film. In the drawing, a reference numeral 7 designates a light source, for which a high luminous source such as an ultra-high-voltage mercury lamp, halogen lamp, zirconium lamp, etc. is desirable. A numeral 8 refers to an aperture to restrict the spatial expansion of a source image and to obtain a light beam with good parallelism. A reference numeral 9 designates a collimator lens which renders the light beam emitted from the aperture 8 to be substantially collimated, and forms an image of the aperture 8 on the front focal plane of a microscope object lens 14 (to be mentioned later). A numeral 10 refers to a polarizing beam splitter which is so disposed as to reflect an S-polarized light beam alone perpendicular to the surface of the drawing sheet and transmit a P-polarized component within the plane of the drawing sheet. In case the characteristic of this polarizing beam splitter is not so idealistic, and the P-polarized component also has a reflecting characteristic to some extent, it is desirable that the polarizing plate 11 be placed in front of the polarizing beam splitter 10 so that the light beam of the P-polarized component may be impinged on the polarizing beam splitter 10. A reference numeral 12 designates a crystal component such as YIG, etc., having the Faraday effect, to which an external magnetic field is applied by means of magnets $13_1$, $13_2$. Accordingly, the polarized light beam transmitted through the crystal is governed by the magnetic rotatory polarization, i.e., its polarized plane rotates by the Faraday effect, and its angle of rotation $\theta$ depends on intensity of the external magnetic field due to the magnets $13_1$, $13_2$. A reference numeral 14 designates a microscope object lens which illuminates the vertically magnetized film 15 substantially vertically. For the vertically magnetized film 15, there have been known crystalline materials such as MnBi, $TbFeO_3$, GdIG, etc., and amorphous materials such as GdCo, GdFe, TbFe, GdTbFe, etc. This vertically magnetized film is formed on a substrate 16 such as glass, Myler, etc., as shown in FIG. 3. Its magnetizing direction can be reversed downward by upwardly magnetizing the entire film to its film surface beforehand and then applying a downward magnetic field to a portion 18 where signals are desired to be recorded, or irradiating laser beam 17 to that portion to raise the temperature at that portion above the Curie point. When the polarized light beam is irradiated onto this vertically magnetized film, the reflected light is subjected to rotation in the polarizing direction due to the magnetic Kerr effect, and its rotational direction differs between the upward magnetization and the downward magnetization, i.e., they become mutually opposite in the directions of $\theta_k$, $-\theta_k$.

The abovementioned reflected light passes through the microscope object lens 14, and the incidence direction of light, which is again subjected to rotation in the polarizing direction under the influence of the Faraday effect at the crystal 12, becomes opposite to the first direction, and the angle of rotation $\theta$ is the same as that of the previous incidence. Accordingly, the reading light beam is subjected to rotation of $2\theta$ in its polarized plane by its passage through the crystal 12 two times.

In this embodiment, the rotational angle $2\theta$ by this rotatory polarizing means is so established that it may become equal to the rotational angle $\theta_k$ due to the Kerr effect in the vertically magnetized film. In other words, the external magnetic field is so established that the rotational angle $\theta$ due to the Faraday effect upon a single passage of light beam through the crystal may become equal to $\theta_k/2$.

In the following, explanations will be given sequentially referring to FIGS. 4A to 4D about the reproduction steps of the recorded information in the optical reading system of the present invention as constructed in the above-mentioned manner.

Figure 4A:
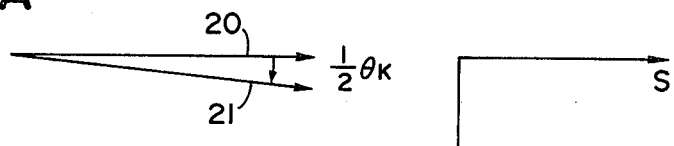
FIGS. 4A through 4D illustrate the polarizing direction of the light beam in the course of reproduction with use of the optical system shown in FIG. 2.

FIG. 4A shows a state, wherein the polarizing direction 20 of the S-polarized component of light beam emitted in the direction of the vertically magnetized film 15 from the polarizing beam splitter 10, as shown in FIG. 2, is subjected to rotation of $\theta_k/2$ by the Faraday effect at the time of its passage through the crystal 12. A numeral 21 refers to a polarized direction of the light beam incident on the vertically magnetized film.

Figure 4B:
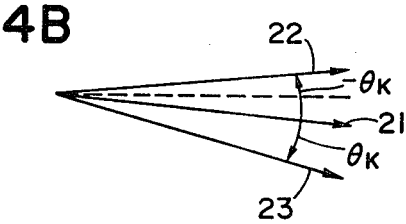

FIG. 4B shows a state, wherein the polarizing direction of the light beam incident on the vertically magnetized film has been rotated by the Kerr effect at the time of its reflection. The rotational direction of the reflected light beam depends on whether the reflected light beam is reflected at the upwardly magnetized domain in the vertically magnetized film, or it is reflected by the downwardly magnetized domain. The reflected light when it is reflected at the upwardly magnetized domain with respect to the polarizing direction 21 of the incident light assumes the direction 22 subjected to rotation of $-\theta_k$, and the reflected light when it is reflected at the downwardly magnetized domain assumes the direction 23 which has been subjected to rotation of $\theta_k$.

Figure 4C:
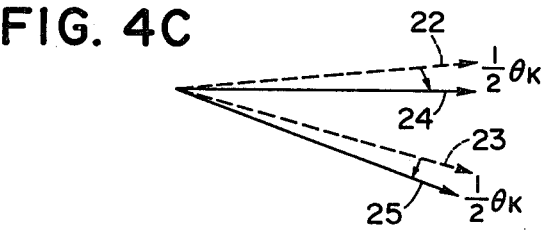

FIG. 4C shows a state when the abovementioned reflected light has passed again through the crystal 12, and has undergone the Faraday effect. The polarizing direction of the reflected light beam from the upwardly magnetized domain and the polarization direction of the reflected light beam from the downwardly magnetized domain are subjected to rotation of $\frac{1}{2} \theta_k$, and are respectively polarized in the directions 24 and 25. Thus, the polarization direction of the reflected light from the vertically magnetized film assumes the S-polarized direction 24 in the light beam reflected from the upwardly magnetized domain, and it assumes the direction 25 having both S and P components in the light beam reflected from the downwardly magnetized domain, by the rotatory polarizing action of the crystal 12.

Figure 4D:
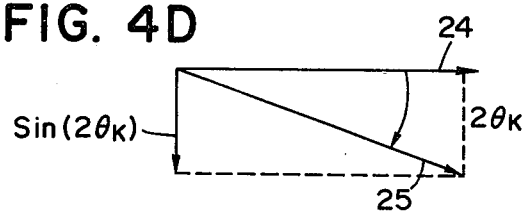

Accordingly, when these reflected light beams enter again into the polarizing beam splitter 10, the reflected light beam in its non-rotational state, i.e., the reflected light beam from the upwardly magnetized domain, which has arrived in the S-polarized state same as that at its initial emission from the polarizing beam splitter, is perfectly reflected, so that the quantity of the transmitted light becomes zero. On the other hand, the reflected light from the downwardly magnetized domain is capable of passing through the polarizing beam splitter 10 in its P-polarized component of $\sin(2\theta_k)$ as shown in FIG. 4D, so that a light quantity of $\sin^2(2\theta_k)$ is emitted toward the eye-piece 19.

As is apparent from the foregoing explanations, the optical system according to the present embodiment provides the rotatory polarizing means having a rotational angle half that of the Kerr rotational angle $\theta$ of the vertically magnetized film in the light path between the polarizing beam splitter and the vertically magnetized film, thereby functioning to offset the rotation of $-\theta_k$ which the polarizing direction of the reflected light has undergone in the upwardly magnetized domain of the vertically magnetized film, and as the result, removing the reflected light from the upwardly magnetized domain by the polarizing beam splitter. On the other hand, since the polarization direction of the reflected light from the downwardly magnetized domain is subjected to rotation of $2\theta_k$, a light quantity of $\sin^2(2\theta_k)$ transmits through the polarizing beam splitter. As the consequence of this, the magnetic domain patterns of the vertically magnetized film can be observed as the bright and dark patterns with high contrast through the eye-piece 19.

Figure 1:
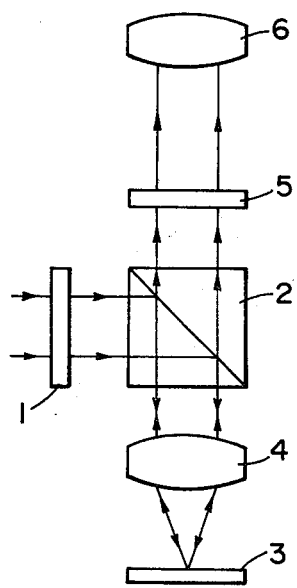
FIG. 1 is a schematic layout of a conventional reading optical system.

In the present embodiment, unlike the conventional optical apparatus as shown in FIG. 1, the analyzer is omitted after the polarizing beam splitter. Further, as mentioned at the outset, the polarizer 11 for the incident light is not essentially required. The reason for this omission is that, when the polarizing beam splitter of a good optical quenching ratio (S-polarized component reflection factor/P-polarized component reflection factor, or P-polarized component transmission factor/S-polarized component transmission factor) is used, this polarizing beam splitter functions as both the polarizer and the analyzer. As is understandable from the above explanations, the beam splitter in the optical system according to the present embodiment does not bring about waste and loss in the light quantity as has heretofore been experienced in the conventional apparatus, hence the magnetic domain pattern can be observed with brightness about four times as bright as that in the known method.

In this embodiment, too, the Faraday rotational angle $\theta$ of the crystal 12 has been set at $\theta_k/2$ as the optimum example, and observation of the magnetic domain pattern can still be done even outside this angle, although the contrast ratio of this magnetic domain pattern varies. Furthermore, as the light path for the incident light beam, there can be established such light path that passes through the polarizing beam splitter, and permits the light beam from the recording medium to be reflected at this polarizing beam splitter.

Figure 5:
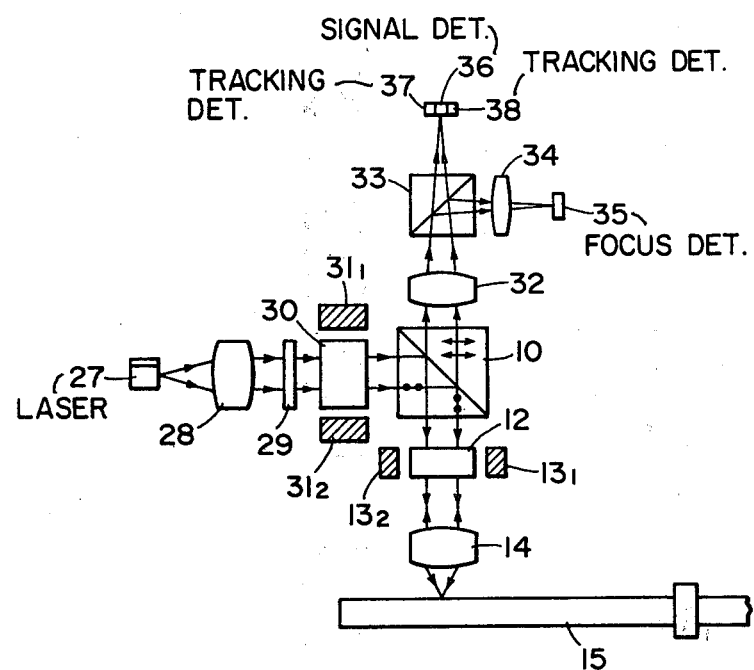
FIG. 5 is a schematic layout of a disc memory reproduction apparatus using the optical system of the present invention shown in FIG. 2.

In the following, explanations will be given as to the optical apparatus of the present invention which is applicable to disc memory of a photo-magnetic recording system, in reference to FIG. 5 showing a cross-section of it. In the drawing, a numeral 27 refers to a semi-conductor laser which oscillates a single mode of laser beam. The oscillating wavelength of the laser beam ranges from 760 mm to 1.3 µm, and its output ranges from 5 to 50 mw. A numeral 28 refers to a collimator lens to render the laser beam to be parallel. A numeral 29 refers to a polarizing plate, the axis of which is set in the polarizing direction of the semiconductor laser. 30 refers to a second Faraday rotator, which consists of a crystal plate of YIG, etc. having the Faraday effect. This crystal plate is applied with an external magnetic field by magnets $31_1$ and $31_2$ to cause the polarizing direction of the incident light beam to rotate by 45 degrees.

In FIG. 5, those reference numerals 10, 12, $13_1$, $13_2$, 14, and 15 designate respectively the polarizing beam splitter, the Faraday crystal, the magnets, the image forming lens, and the vertical magnetic recording member. To this polarizing beam splitter 10, there is projected light beam which has been polarized by the Faraday rotator 30 and rendered the S-polarized light beam (a light beam which has been polarized in the direction perpendicular to the surface of the drawing sheet).

The crystal plate 12 causes the polarizing direction of the incident light beam to rotate by a half amount ($\frac{1}{2}\theta_k$) of the Kerr rotational angle which the recording member 15 possesses, as is the case with the previous embodiment. The image forming lens 14 functions to converge the incident light beam on the recording member 15.

The reflected light beam from the recording member 15 is subjected to rotation in the polarization direction by the Kerr rotational angle, and is further subjected to the Faraday rotation by the crystal plate 12 to reach the polarizing beam splitter 10.

By the principle as already explained in the previous embodiment, only the light beam incident on the downwardly magnetized portion in the vertical magnetic recording member transmits through the polarizing beam splitter 10.

In the drawing, a reference numeral 32 designates an image forming lens, 33 refers to a beam splitter, 34 denotes a cylindrical lens, 35 designates a quartered focus detector, 36 represents a signal detector, 37 and 38 refer to tracking signal detector.

A signal light beam transmitted through the polarizing beam splitter 10 is separated into three light beams by a diffraction grating (not shown) inserted into an incident optical system, as has been well known heretofore, and the separated light beams are focused on the detectors 36, 37 and 38 by the image forming lens 32, while a part of the light beam split by the beam splitter 33 is focused on the detector 35.

Focussing between the image forming lens 14 and the recording member 15 is done in utilization of a phenomenon, wherein the focussed spot varies its shape in vertically long, circular, and horizontally long ones in corespondence to focus deviation quantity due to the function of the cylindrical lens 34.

the S-component of the reflected light from the recording member 15 is reflected at the polarizing beam splitter 10, and reversely enters into the semiconductor laser 27. This incident light gives noises to the oscillating state of the semiconductor laser.

In order to prevent this reversed incident light, there are provided the polarizing plate 29 and the 45°-Faraday rotator 30. The S-polarized component light beam reflected to the side of the light source at the polarizing beam splitter 10 passes again through the 45°-Faraday rotator 30, thereby causing the polarizing direction to rotate by 45°, whereby the light beam enters into the polarizing plate 29 with 90° rotation with respect to its axial direction (deflecting direction). Accordingly, this light beam cannot pass through the polarizing plate 29 and its reverse incidence into the semiconductor laser 27 is prevented.

So far, explanations have been made as to the methods of observing the magnetic domain in the vertical magnetic recording member and of signal reading according to the present invention. One of the characteristics of the optical system according to this invention resides in that the system can also be used in the signal recording, by the laser beam, on the photo-magnetic recording member. The reason for this feasibility is that the optical system according to the present invention has no substantial loss in the light quantity, which makes it possible to emit the entire incident light beam, as it is, into the polarizing beam splitter in the direction of the magnetic medium, as contrasted to the conventional signal reading optical system utilizing a half mirror, where the loss in the light quantity in the beam splitter is large, which cannot be used as the signal writing system due to shortage in power.

Incidentally, it is to be noted that, for the vertically magnetized recording medium capable of reading information with the optical system according to the present invention, there may be included, besides tapes or discs having the vertically magnetized coating where information has been directly recorded, those vertically magnetized transfer films such as magnetic garnet thin film, etc. placed in close contact with general magnetic tape such as chromium dioxide ($CrO_2$), etc.

As is apparent from the foregoing explanations, the present invention provides a reading optical system capable of reducing loss in the light quantity in the course of detecting the magnetic domain pattern in the vertical magnetization recording medium. Such optical system is capable of dispensing with the polarizer and the analyzer, and further provides very useful effect such that it can be commonly used for both reading and recording.

I claim:

1. An optical apparatus to reproduce information recorded in a magnetic recording medium by utilization of the interaction between light and magnetism, which comprises:
   (a) a light source to supply a light beam for reproduction;
   (b) a polarizing beam splitter, the transmission and reflection factors of which depend on the polarization direction of the light beam, and which leads said light beam for reproduction from said light source to the magnetic recording medium, and, in interaction with the magnetism in said magnetic recording medium, receives again said emitting light beam for reproduction to lead it to a direction different from the direction of said light source; and
   (c) rotatory polarizing means disposed in a light path of said light beam for reproduction between said polarizing beam splitter and said magnetic recording medium, and to rotate the polarized plane of said light beam for reproduction.

2. The optical apparatus as set forth in claim 1, wherein said information is recorded in the form of a magnetic domain pattern to be produced in said magnetic recording medium with an upwardly magnetized zone and a downwardly magnetized zone.

3. The optical apparatus as set forth in claim 2, wherein said rotatory polarizing means is provided in such a manner that the total rotatory polarizing angle to be imparted to said light beam for reproduction may be equal to a rotational angle of the polarized plane of said light beam for reproduction to be produced by the magnetic Kerr effect at the magnetized zones in said magnetic recording medium.

4. The optical apparatus as set forth in claim 1, further comprising a second rotatory polarizing means with a rotatory polarizing angle of 45° in the light path defined between said light source and said polarizing beam splitter.

5. A method for reproducing information recorded in a magnetic recording medium, comprising the steps of:
   (a) causing a linearly polarized light beam for reproduction to impinge on said magnetic recording medium through a polarizing beam splitter;
   (b) leading again into said polarizing beam splitter said light beam for reproduction, the polarized plane of which has been rotated either positively or negatively depending on the magnetizing direction of said magnetic recording medium by the interaction with the magnetism;
   (c) subjecting said light beam for reproduction to a predetermined rotatory polarization by a predetermined angle of rotation, while said light beam for reproduction from said polarizing beam splitter is again returning to said polarizing beam splitter through said magnetic recording medium; and
   (d) splitting by said polarizing beam splitter a component corresponding to said information out of said light beam for reproduction which has returned to said polarizing beam splitter.

* * * * *